June 19, 1962

G. A. FISHER 3,039,567

FLUID COOLED BRAKE

Filed Nov. 23, 1959

INVENTOR.
George A. Fisher
BY
HIS ATTORNEY

June 19, 1962   G. A. FISHER   3,039,567
FLUID COOLED BRAKE
Filed Nov. 23, 1959   2 Sheets-Sheet 2

INVENTOR.
George A. Fisher
BY
HIS ATTORNEY

United States Patent Office 3,039,567
Patented June 19, 1962

1

3,039,567
FLUID COOLED BRAKE
George A. Fisher, Mentor on the Lake, Ohio, assignor to General Motors Corporation, Detroit, Mich., a corporation of Delaware
Filed Nov. 23, 1959, Ser. No. 854,960
6 Claims. (Cl. 188—264)

This invention relates to a fluid cooled disk brake and more particularly a means for transferring the heat created within the braking structure to some external point where the heat may be radiated.

In the heavier type of vehicles particularly where a heavy load is being carried down a long grade it is necessary to provide some means for cooling the braking structure. Under these conditions considerable heat is created within the braking structure which must be removed from the braking structure. This requires adequate braking capacity coupled with a means for continually removing the heat created within the braking structure to some external point.

Accordingly, this invention is intended to accomplish this function. The braking structure is a compact unit mounted within the wheel and a fluid means is used to cool the braking structure and transfer it to an external cooling system. The fluid cooling system external of the braking structure may be any fluid cooling system employed on the vehicle or a specific system intended to accomplish the cooling for the braking means only.

It is an object of this invention to provide a vehicle disk brake mounted entirely within the vehicle wheel and a fluid means for transferring the heat from the braking structure to a point where it may be readily dispersed.

It is another object of this invention to provide a braking means within the vehicle wheel and a fluid means for transferring the heat from within the brake structure having circulating means in connection with the wheel structure to provide circulation of a fluid for transferring the heat from the braking structure.

It is a further object of this invention to provide constant fluid circulation by means of a structure rotating as a part of the wheel to transfer heat from within the braking structure to a point where it may be easily transferred externally for radiation to the atmosphere.

It is a further object of this invention to provide continual circulation of a fluid as a vehicle wheel is rotated for transferring heat from within the braking structure to a point where the heat may be transferred to a secondary cooling system externally of the vehicle wheel and brake structure.

The objects of this invention are accomplished by providing a vehicle disk brake which is located entirely within a vehicle wheel. The brake operates in conjunction with a sun gear and a planetary gear arrangement for rotating the vehicle wheel. A ring gear is also employed in combination with the sun gear and planetary gear. The ring gear is connected to the stator disks of the brake. The rotating disks are connected to the vehicle wheel. Passage means are provided within the braking structure for circulating of fluid. A plurality of buckets are mounted within the vehicle wheel to cause continual circulation of a fluid to transfer the heat from the braking structure to point adjacent to a secondary fluid cooling system.

The secondary cooling fluid system includes a number of cooling cores which contain the cooling fluids from the external cooling system. The fluid circulated through the brake is continually flowing over the cooling core to transfer the heat from the circulating system internal of the vehicle wheel to the external or secondary fluid cooling system. In this manner a continuous circulation is provided within the vehicle wheel to cool the braking structure at all times when the vehicle wheel is in rotation.

Further objects and advantages of the present invention will be apparent from the following description, reference being had to the accompanying drawings wherein preferred embodiments of the present invention are clearly shown.

The device illustrated is primarily intended to provide a braking means of large capacity which may be in continual operation for a considerable time. This type of a braking device is also provided with a cooling means to remove the heat created in the braking structure. The fluid within the vehicle wheel is circulated by the motion of the wheel which provides a continual heat transfer from the braking means to a point where it may be readily conveyed to an external cooling system. The device is relatively simple and fool-proof and provides operation of the cooling means at all times.

Figure 1:
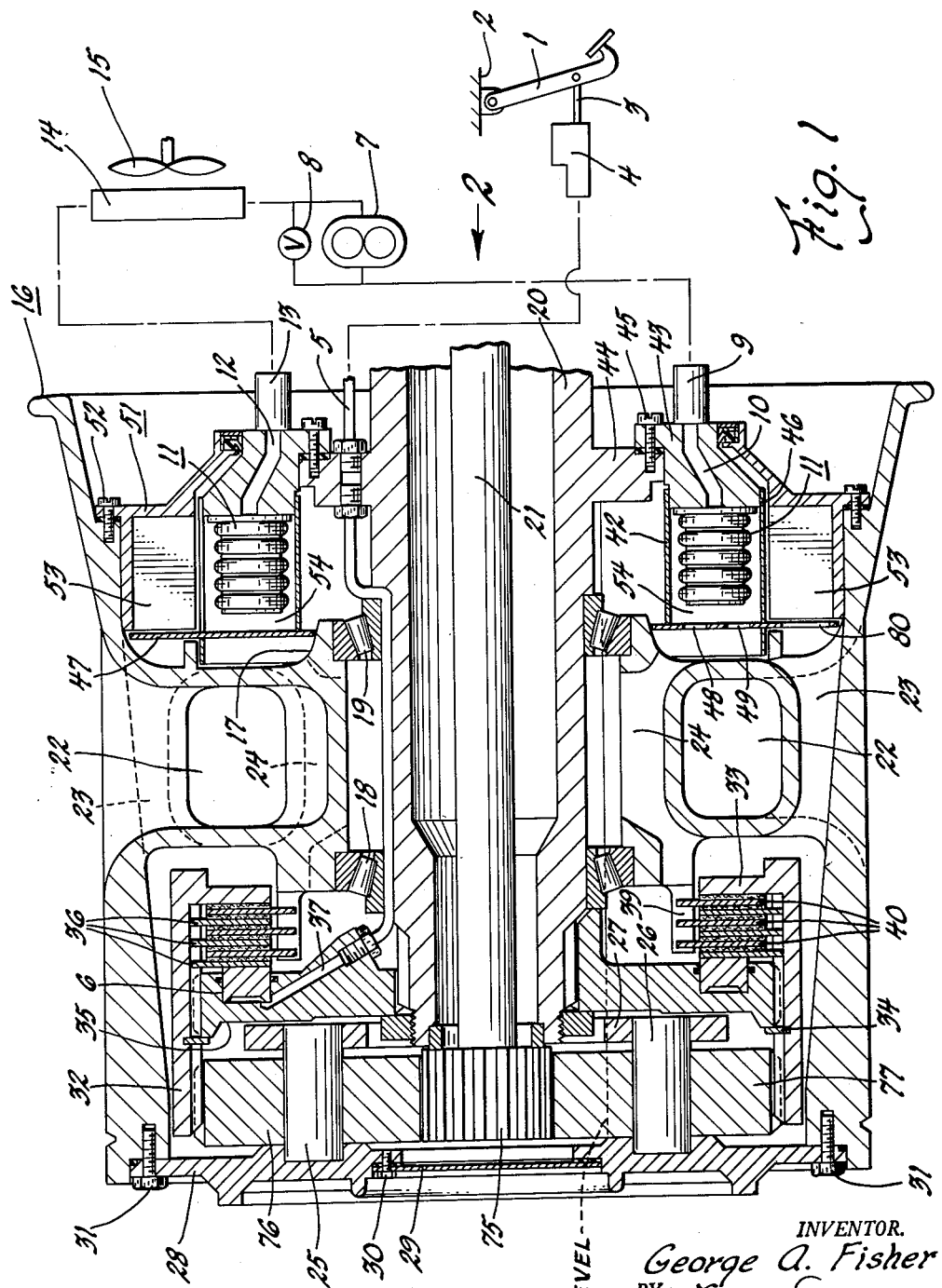
FIGURE 1 is a cross section view taken on line 1—1 of FIGURE 2 showing the vehicle wheel and brake structure and the internal circulatory cooling system, with the secondary fluid cooling system in a diagrammatic illustration.

FIGURE 1 shows a cross section view of the parts within the braking structure and the relative positions to each other. The schematic portion shows the external cooling system for the vehicle brakes and also the fluid actuating means which is manually controlled. A brake pedal 1 is pivotally mounted on the chassis 2. The brake pedal 1 is pivotally connected to a pushrod 3 which operates a master piston within the master cylinder 4. The master cylinder 4 is in communication with the conduit means 5 which lead directly to the annular wheel cylinder 35 for operating the vehicle brakes. The conduit means 5 includes the necessary connections and fittings to transmit the fluid to the annular hydraulic wheel cylinder 35.

The cooling system external of the vehicle brakes is also shown diagrammatically. This includes a means for circulating the fluid such as the pump 7 with the by-pass valve 8 in parallel with the pump 7. The pump 7 is in communication with a conduit means 9 which leads to the inlet port 10 and the cooling core 11. A plurality of cooling cores are connected with each other which feed into the outlet port 12. The outlet port is in communication with the conduit means 13 which is connected to a radiator 14. The radiator 14 is cooled by means of a fan 15 which may be driven by any convenient source of power.

The cooling circuit external of the vehicle braking means may employ a separate fluid system or the vehicle radiator and cooling system for the vehicle engine which has a portion feeding through the braking structure as shown. The cooling system employs a convenient source of power such as the engine for operating the pump and fan.

The vehicle wheel 16 is provided with a hub section 17 which is rotatably mounted on the bearing assemblies 18 and 19. The bearing assemblies 18 and 19 are supported on the shaft housing 20. The shaft housing 20 encloses a shaft 21 for driving of a sun gear 75.

Figure 2:
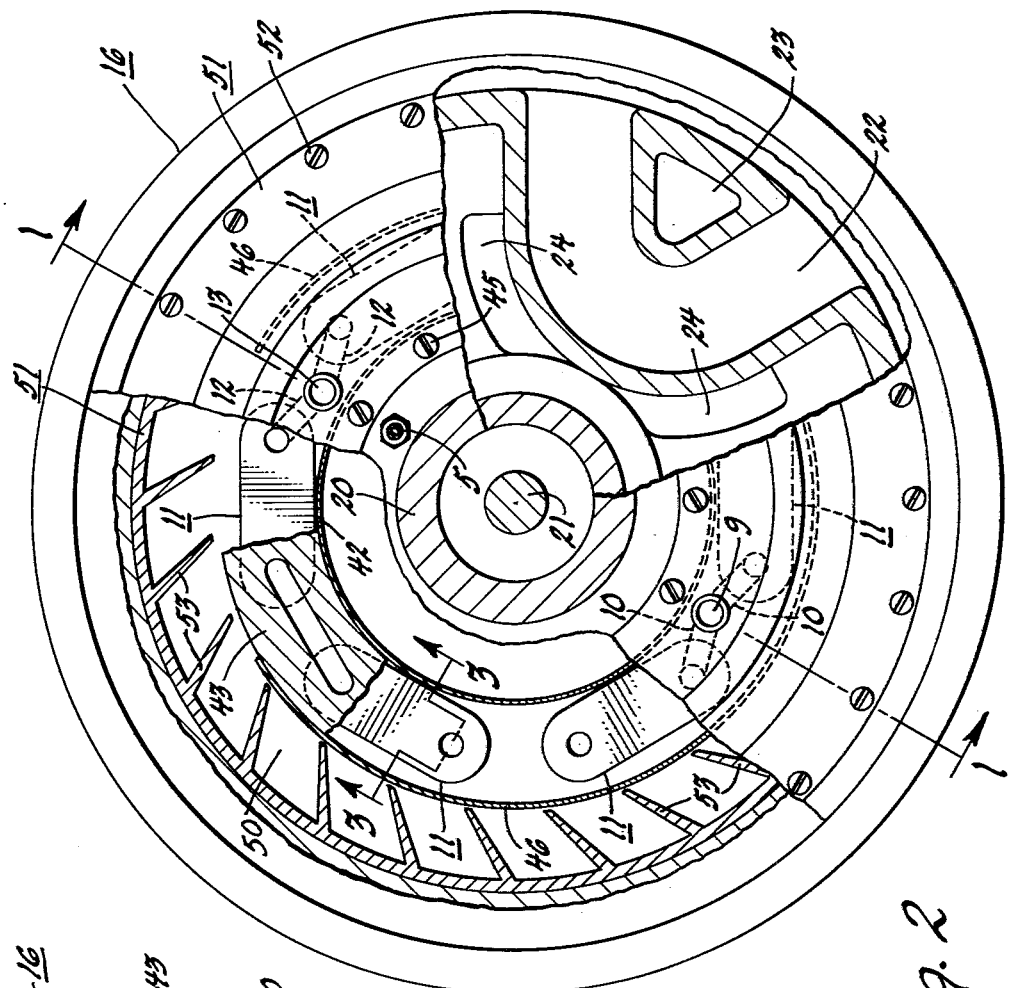
FIGURE 2 is a side elevation view with portions of the braking structure broken away to more clearly show the relative positions of the various parts within the braking structure.

The wheel 16 is provided with openings 22 extending inward from the rim section as shown in FIGURE 2. These openings 22 form U-shaped passages from the rim section to the hub section and then return to the rim section of the wheel. These U-shaped passages 22 form axially extending passages 23 and 24 which provide passage means for the cooling fluid. It is noted that the outer periphery of the passage 23 adjacent the rim section of the wheel is inclined to an axial line to provide a centrifugal flow from the braking structure to the cooling core side of the wheel. The passage 24 adjacent the hub section of the wheel permit return flow of the fluid.

The fluid is permitted to flow above and below the passage 22. It is noted that openings 48 and 49 are provided in the baffles adjacent to the cooling core 11 and also an opening 80 to the buckets 50 in the portion of the wheel that is down. The baffles are mounted stationary relative to the wheel and are fastened to the shaft housing 20.

The drive shaft 21 is connected to the sun gear 75. The sun gear 75 meshes with the planetary gears 76 and 77. The planetary gears 76 and 77 are carried on their respective pins 25 and 26. The planetary gears 76 and 77 are supported by the annulus 27 on the inboard side which is carried on the plurality of pins supporting the planetary gears. The main structure for alignment of the planetary gears and aligning the annulus 27 is the end plate 28. The end plate 28 is provided with a cover plate 29 closing a central opening within the end plate 28. The cover plate is fastened by means of a plurality of bolts 30. The end plate 28 is fastened by means of a plurality of bolts 31 which threadedly engage the end portion of the vehicle wheel 16. In this manner the wheel 16 and the end plate 28 carries the planetary gears and rotates as the wheel rotates. The planetary gears also mesh with a ring gear 32 which has gear teeth on its inner periphery.

The ring gear 32 extends axially inboard where it forms the backing plate 33 which is an integral part of the gear. The ring gear 32 and the backing plate are held in position by the snap ring 34 which engages the outboard side of the annular hydraulic cylinder 35. The annular hydraulic cylinder member is spline connected to the ring gear 32. Spaced axially inboard from the annular hydraulic cylinder 35 are a plurality of stationary brake disks 36. These brake disks are also spline connected to the ring gear 32. In this manner the extension of the ring gear teeth provide a means for mounting the annular hydraulic wheel cylinder 35 and the plurality of stator disks 36. The backing plate 33 also forms a portion lying adjacent to the brake disks but on the inboard side of the brake disks.

In cooperating with the annular hydraulic wheel cylinder 35, the annular hydraulic wheel piston 6 is received within the annular groove formed in the annular hydraulic wheel cylinder. The hydraulic wheel piston 6 is provided with a sealing means about its outer periphery seated within an annular recess in the annular hydraulic wheel cylinder 35. A passage means 37 is also provided in the annular hydraulic wheel cylinder 35 connecting the conduit 5 to the pressurizing chamber.

The wheel 16 is also provided with an axially extending flange 39 having a plurality of teeth for engaging the inner periphery of a plurality of rotating disks 40. The disks 40 have a plurality of grooves formed in the radial surface that contacts the stator disks 36. The grooves permit passage of fluid between the disks. The rotating disks 40 rotate with the wheel and are alternately spaced between the stator disks 36. The movement of the hydraulic piston 6 during brake actuation compresses the stator disks 36 with the rotor disks 40 to cause frictional engagement and actuation of the braking means.

In this manner a compact braking means is mounted within the outer section of the vehicle wheel 16. The driving means including the planetary gears are also mounted within this section of the vehicle wheel. The driving means is lubricated and the brake disks are cooled by maintaining an oil level in the wheel which is above a portion of the planetary gears and the brake disks.

The oil level is also above a portion of the cooling coils and a portion of the buckets on the opposite side of the vehicle wheel.

The opposite side of the vehicle wheel encloses the cooling means and the means for providing the constant circulation of the fluid within the vehicle wheel. This is accomplished by providing baffles and a plurality of cooling cores within this section of the vehicle wheel. The baffles comprise a central sleeve 42 which is mounted on the inner periphery of the core supporting plate 43. The core supporting plate 43 is mounted on the radial flange 44 of the axle housing 20. The core supporting plate 43 is connected to the flange 44 by a plurality of bolts 45. The sleeve portion 42 provides a closed wall on the radially inner side of the cooling cores 11.

A second sleeve 46 is spaced radially outward from the sleeve 42. These sleeves enclose the cooling cores 11. The sleeve 46, however, has the upper portion cut away to permit entrance of fluid discharged by a plurality of cups or buckets 50. The sleeve 46 is mounted on the core supporting plate 43.

The sleeve 42 and the sleeve 46 extend axially outboard where they adjoin an annular plate 47. The annular plate 47 is connected to the sleeves 42 and 46 to provide a closed annular chamber to receive the plurality of cooling cores 11. The lower portion of this plate 47 is provided with a plurality of holes 48 and 49 to permit exhaust of fluid from the lower portion of the annular chamber 54. The annular disk 47 and the sleeve 46 also form a second chamber with the bucket carrier 51. The bucket carrier 51 is fastened to the wheel by means of a plurality of bolts 52. The bucket carrier carries a plurality of buckets 53 on its inner periphery. These buckets rotate with the wheel carrying fluid from the lower portion of the second annular chamber 50 to discharge the fluid within the annular chamber 54 which contains the plurality of cooling cores 11. In this manner as the wheel rotates the plurality of buckets 53 pick up a quantity of fluid on the low side of the wheel and carry the fluid to the high side where it is discharged within the annular chamber 54 and again passes downwardly through the annular chamber 54 to cool the fluid. This cooling process is continuous so long as the wheel is in rotation.

Referring to FIGURE 2, the plurality of buckets 53 are shown formed as an integral part of the bucket carrier 51. The annular chamber 50 receives the plurality of buckets 53 and provides a means for enclosing fluid contained within the buckets as the buckets carry fluid to the top side of the wheel as the wheel rotates.

The core carrying plate 43 is shown in cross section to ilustrate the connections between the several cooling cores 11. The outlet port is shown at the top side of the wheel indicated by 12. The inlet port is indicated by the passage 10. The fluid flows from the low side of the inlet port 10 through the plurality of cooling cores 11 and passes outwardly through the outlet port 12.

Figure 3:
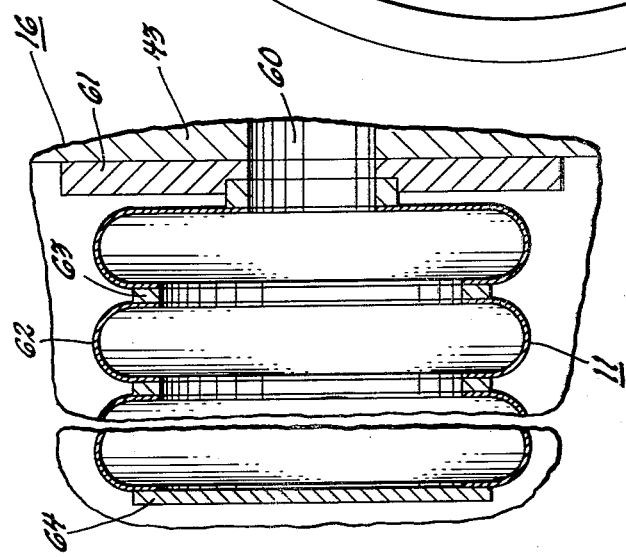
FIGURE 3 is a cross section view of the cooling core taken on line 3—3 of FIGURE 2.

FIGURE 3 illustrates a cross section and enlarged view of one of the cores 11. The inlet port 60 is formed within the core carrying plate 43. The cooling core 11 is fastened by the plate 61. The cooling core is formed with a plurality of folds 62. The plurality of folds 62 are fastened to each other by means of a plurality of reinforcing ribs 63. The end fold is closed by a plate 64. This assembly is all welded together to form a unit and is fastened to the core carrying plate 43.

This cooling device operates in the following described manner. As the brake pedal 1 is depressed the fluid is pressurized in the master cylinder 4. This, in turn, pressurizes fluid within the conduit means 5 and the annular hydraulic cylinder 35. Pressurization within this cylinder 35, in turn, actuates the vehicle brakes through the piston 6. Continued actuation of the vehicle brakes creates heat within the braking structure.

The external fluid cooling system as indicated in the diagrammatic portion of FIGURE 1 is in constant operation when the vehicle is in operation. The pump 7 circulates fluid through the cooling cores 11 which passes through the radiator 14 and again returns to the low side of fluid cooling pump 7. This provides a constant cooling effect of the plurality of cooling cores 11 mounted within the inboard side of the wheel structure. This provides a means of transferring the heat from the internal fluid system to a point outside of the wheel where the heat may be radiated to the atmosphere.

The cooling cores mounted within the wheel structure have a thin wall to readily transfer heat from the internal fluid system to the external fluid system.

The wheels 16 contain a fluid system enclosed within the wheel for circulating a fluid for cooling of the vehicle brakes. This fluid system circulates the fluid over the planetary gears and the braking mechanism of the outboard side of the wheel and through the baffles and circulating means as well as the cooling means on the inboard side of the vehicle wheel. The fluid cooling system within the wheel structure contains a reservoir which fills the lower portion of the vehicle wheel. The oil contained in the lower portion of the wheel constantly cools the brake disks as the wheel rotates. As the wheel rotates the fluid also runs along the inclined surface in passage 23 to the rim section of the wheel. The flow of fluid passes from the brake structure to the inboard side of the wheel where the fluid enters the chambers 50 through the plurality of openings 80. In this manner the oil reservoir provides a constant supply of fluid at the lower portion of the chamber 50. As the wheel rotates the buckets 53 are filled with oil and continue to carry the oil around with the wheel through the annular chamber 50. As the bucket 53 reaches the point where the sleeve 46 is cut away the fluid is discharged into the chamber 54. This, in turn, causes the fluid to flow over the outside of the plurality of the cooling cores 11. The heat within the fluid passing over the outside surface of the cooling cores 11 is transferred through the metal to the fluid on the inside of the cooling cores 11. This heat, in turn, is circulated by the external cooling systems described in the above paragraph.

The fluid which passes through the opening formed in sleeve 46 passes downwardly through the annular chamber 54. As the fluid passes downwardly it is discharged through the openings 48 and 49. The fluid is then permitted to pass through the passage 24 above the passage 22. The axially extending passage 24 circulates the fluid back to the braking structure where it again is permitted to pick up heat from the braking structure. The fluid passing over the braking structure cools the braking structure and passes down the passage 23 and again is circulated by the buckets 53 as the wheel is continuously rotated.

In this manner the fluid within the wheel structure is permitted to provide a constant cooling of the braking structure at all times the wheel is in rotation. The means for creating the circulation has a minimum of moving parts and is fool-proof and, yet, maintains a constant movement of the fluid. A continual passing of the fluid over the cooling cores 11 provides a means to transfer the heat to an external cooling system. This manner of cooling the brakes greatly increases the capacity of the braking structure and also provides a means for continual braking over long grades when the vehicle is carrying a heavy load.

While the embodiments of the present invention as herein disclosed, constitute preferred forms, it is to be understood that other forms might be adopted.

What is claimed is as follows:

1. In a brake cooling device comprising in combination, a stator member, a vehicle wheel rotatably mounted on said stator member, said wheel forming a chamber for a brake including at least one stator disk mounted on said stator member, at least one rotor disk mounted on said vehicle wheel for rotation with said vehicle wheel, means for actuating said vehicle brake, a baffle means forming a second chamber with said stator member, a heat exchanger for reception within said second chamber in said baffle means and including a plurality of cooling cores, an external fluid cooling system having means for forced circulation in communication with said plurality of cooling cores, a third chamber formed by said baffle means and said wheel for reception of a plurality of buckets formed on a member rotating with said vehicle wheel, passage means connecting said brake chamber with said second chamber and said third chamber, said buckets thereby providing continuous circulation of a cooling fluid within said vehicle wheel and circulating the fluid over said plurality of cooling cores thereby cooling said braking structure.

2. In a brake cooling device comprising in combination, a stator member, a vehicle wheel rotatably mounted on said stator member, said vehicle wheel forming a chamber for a brake including at least one stator disk mounted on said vehicle wheel, means for actuating said brake, a baffle means forming an annular chamber for reception of a plurality of cooling cores, an external fluid cooling circuit having means for circulating a cooling fluid through said plurality of cooling cores, passage means connecting said brake chamber with said heat exchanger chamber, an annular passage means formed by said baffle means, passage means connecting said brake chamber with said annular passage means, a plurality of buckets formed on a member for rotation with said vehicle wheel and conveying fluid through said annular passage means formed by said baffle means thereby providing continuous circulation of the cooling fluid within said vehicle wheel and passing over said plurality of cooling cores when said vehicle wheel is in rotation.

3. In a brake cooling device comprising in combination, a stator member, a vehicle wheel rotatably mounted on said stator member, said vehicle wheel forming a chamber for a brake including at least one stator disk mounted on said stator member, at least one rotor disk mounted for rotation with said vehicle wheel, means for actuating said brake, a plurality of buckets mounted for rotation with said vehicle wheel, a baffle means forming an annular chamber for reception of a plurality of cooling cores, passage means connecting said brake chamber with said cooling core chamber, an external brake cooling fluid system having means for providing forced circulation of cooling fluid througuh said plurality of cooling cores, said baffle means forming a bucket chamber for transfer of fluid by said plurality of buckets on said vehicle wheel, said buckets thereby providing continuous circulation of a cooling fluid over said plurality of cooling cores thereby providing a means for cooling of said brake structure when said vehicle is in rotation.

4. In a brake cooling device comprising in combination, a stator member, at least one stator disc connected to said stator member, a rotor member rotatably mounted on said stator member, at least one rotor disc connected to said rotor member, a brake chamber for receiving said stator disc and said rotor disc, means for actuating the brake, a cooling core chamber formed in said stator member, a plurality of cooling cores received within said core chamber, an annular chamber formed in said stator member, an annular member connected to said rotor member received within said annular chamber, a plurality of fins extending substantially radially inward from said annular member, a fluid circuit including passage means connecting said brake chamber, said annular chamber and said core chamber, said plurality of fins providing forced circulation of a cooling fluid through said fluid circuit to provide cooling of said braking means when said rotor member is in rotation, and an external cooling fluid system in communication with said plurality of cooling cores for cooling of said cooling cores.

5. In a brake cooling device comprising in combination, a stator member, at least one stator brake disc connected to said stator member, a rotor member rotatably mounted on said stator member, at least one rotor brake disc connected to said rotor member, a braking chamber receiving said rotor brake disc and said stator brake disc, means for engaging said brake discs, a bucket chamber formed in said stator member, a bucket member connected to said rotor member, a plurality of buckets on said bucket member for rotation within said bucket chamber, a heat exchanger chamber formed in said stator member, a heat exchanger received within said heat exchanger chamber, passage means connecting said brake chamber, said heat exchanger chamber and said bucket chamber providing a cooling fluid circuit, said plurality of buckets rotating in said bucket chamber to provide forced circulation of cooling fluid through said fluid circuit when said rotor member is rotated, and an external cooling fluid system in connection with said heat exchanger for cooling said heat exchanger.

6. In a brake cooling means comprising in combination, a braking means including a stator member, stator disks mounted on said stator member, a wheel member, a rotating disk carried by said wheel member rotating adjacent to said stationary disk, means for actuating said braking means, a chamber in said wheel containing said braking means, a cooling system including an annular cooling core chamber in said stator member, a plurality of cooling cores in said chamber, a bucket chamber in said stator member, a plurality of buckets operating in cooperation with said wheel in said bucket chamber to provide a forced circulation of fluid, passage means connecting said brake chamber with said bucket chamber and said core chambers, said buckets discharging fluid through said passage means over said cooling cores to provide means for transferring heat from said braking means to said cooling cores, an external fluid cooling system in communication with said cooling cores to provide a means for transferring heat externally from said braking means.

References Cited in the file of this patent

UNITED STATES PATENTS

| | | |
|---|---|---|
| 1,049,677 | Craig | Jan. 7, 1913 |
| 1,174,678 | Carpenter et al. | Mar. 7, 1916 |
| 1,380,584 | Parker | June 7, 1921 |
| 2,008,164 | Wolf | July 16, 1935 |
| 2,361,726 | Weimar | Oct. 31, 1944 |
| 2,911,071 | De Gelleke | Nov. 3, 1959 |
| 2,928,504 | Hahn et al. | Mar. 15, 1960 |
| 2,940,549 | Hause et al. | June 14, 1960 |

FOREIGN PATENTS

| | | |
|---|---|---|
| 742,120 | France | Dec. 21, 1932 |
| 851,407 | France | Oct. 2, 1939 |
| 1,215,440 | France | Nov. 16, 1959 |
| 701,725 | Great Britain | Dec. 20, 1953 |